FIG. I

INVENTOR.
STERLING W. ALDERFER
BY Hamilton & Cook
ATTORNEYS

INVENTOR.
STERLING W. ALDERFER

FIG. 5

INVENTOR.
STERLING W. ALDERFER

July 2, 1968  S. W. ALDERFER  3,390,813
SYSTEM FOR METERING, MIXING AND DISPENSING
DEGASIFIED URETHANE ELASTOMERS Filed Jan. 3, 1967  7 Sheets-Sheet 5

INVENTOR.
STERLING W. ALDERFER
BY Hamilton & Cook
ATTORNEYS

INVENTOR.
STERLING W. ALDERFER
BY Hamilton & Cook
ATTORNEYS

INVENTOR.
STERLING W. ALDERFER
BY
ATTORNEYS

United States Patent Office 3,390,813
Patented July 2, 1968

3,390,813
SYSTEM FOR METERING, MIXING AND DISPENSING DEGASIFIED URETHANE ELASTOMERS
Sterling W. Alderfer, Akron, Ohio, assignor to Sterling Alderfer Company, Akron, Ohio, a corporation of Ohio
Filed Jan. 3, 1967, Ser. No. 606,608
13 Claims. (Cl. 222—134)

ABSTRACT OF THE DISCLOSURE

The system utilizes a head in which the mixing chamber is located. The components are continuously pumped to the head from heated stock pots which are, in turn, supplied from moisture-barriered reservoirs. A partial vacuum is applied to each stock pot, and valve means in the head permit the individual components pumped thereto to be returned to their respective stock pots through separate recirculating lines, or, selectively, to be admitted to the mixing chamber. The flow rate from the stock pots to the mixing head can be controlled, and restrictive flow means are provided in the recirculating lines which, together with at least one modulating means in the head, provides for selective, simultaneous actuation of any one mitted to the mixing chamber. A clutching arrangement provides for selective, simultaneous actuation of any one or more of the valve means.

Background of the invention

The present invention relates generally to a system for metering, mixing and dispensing liquid materials. More particularly, the present invention relates to a system for assuring degasification of elastomer forming components through a unique dispensing head. Specifically, the present invention relates to a system particularly adapted for maintaining urethane elastomer forming components degasified through a self-cleaning mixing head capable of intermittently dispensing accurately metered formulations.

Urethane elastomers have been available for some time and are prepared by mixing together polyesters, polyisocyanates, and chain extenders in a liquid state at elevated temperatures. This mixture may be poured into molds, and, after a period of solidification, the solid, but uncured, elastomer is removed. Complete cure of this so-called "green" material can then be accomplished in an oven.

Technically, elastomers are produced through the reaction of certain polyisocyanates and polyhydroxy compounds to form a long chain, essentially linear macromolecule which is then chain extended and cross-linked to complete the reaction.

Elastomers may be selectively produced within a very wide hardness range. They are extremely tough and elastic, having excellent tensile and tear strengths, high elongation, and superb resistance to abrasion, ozone and oxidation.

Typical applications include: mallet heads, shock absorbent pads, bearings, solid tires for industrial trucks, friction wheels, gaskets, sprockets, gears and the like. Urethane elastomer may even be calendered to form sheet material. Besides having the strength and wear characteristics noted above, urethane sheets have been found to have heat resistance in excess of 200° F. and some formulations refuse to become brittle at temperatures approaching —100° F.

For use in the applications described above the finshed product must, for the greatest strength, be free from air pockets or other bubbles. The components from which elastomers are produced can be commercially purchased in a state of alleged degasification. However, it has been found that such components do not possess the requisite freedom from entrained gases to produce bubble free elastomers. Moreover, prior known metering, mixing and dispensing equipment is not capable of satisfactorily degasifying the components, or, for that matter, is not capable of maintaining the components degasified to the degree they were when purchased.

Besides entrainment of air, another contaminant ruinous to a satisfactory final product is moisture.

These difficulties are further compounded in a system adapted for intermittent metering, mixing and discharging. For example, once the components from which urethane elastomers are made are mixed preparatory to dispensing they begin to react immediately and will begin to "cream," or thicken, within seconds.

Additional difficulties are encountered when the components are of diverse viscosity. First, the diversely viscose materials must be thoroughly mixed before dispensing. Second, and particularly when the dispersed charges are varied over a range of from a few drops to many pounds, the amount of the materials must be consistently proportionate.

Summary of the invention

It is therefore an object of the present invention to provide a system for degasifying components for producing urethane elastomers and maintaining said components degasified through the metering, mixing and dispensing stages of the system.

It is another object of the present invention to provide a system, as above, in which the components are protected against contamination by moisture.

It is still another object of the present invention to provide a system, as above, which is adapted for intermittent dispensing of components metered and mixed to produce urethane elastomers.

It is yet another object of the present invention to provide a system, as above, in which components of diverse viscosity can not only be readily mixed and discharged but also metered in consistent proportionality, irrespective of the quantities being dispensed and the interval of time between intermittent dispensations.

It is a further object of the present invention to provide a system, as above, in which the components are continuously recirculated between a supply means and a unique mixing and dispensing head.

It is a still further object of the present invention to provide a unique head particularly adapted for use in the system, as above, and which is capable of mixing two or more components in one or more formulations selectively dispensing the desired formulation.

It is an even further object of the present invention to provide a mixing and dispensing head, as above, in which the mixture can be selectively voided from the mixing chamber in the head and the head self-cleaned.

It is yet a further object of the present invention to provide a mixing and dispensing head, as above, from which all components may be individually dispensed to determine and establish the metering thereof so that thereafter microsecond, surge free, proportionate mixing and dispensing of a degasified mixture will be assured irrespective of the relative viscosities of the components required for the desired mixture, the quantity of the charge dispensed, and, the interval between intermittent dispensations.

These and other objects which will become apparent from the following specification are accomplished by means hereinafter described and claimed.

In general, a system according to the concept of the present invention for metering, mixing and dispensing a formulation from two or more liquid components maintains each component in a stock pot to which a vacuum is applied. Each stock pot is connected to the dispensing head by a feed line and a recirculating line. Individual valve means are provided in the head to connect each feed line to the corresponding recirculating line, or, selectively, to the mixing chamber in the dispensing head. Pump means are continuously moving each component outwardly of the stock pot through the feed line, the pumping rate of each pump means being a function by which metering to the mixing chamber is controlled.

Each recirculating line includes a restrictive flow means, and at least one of the feed lines communicates with the mixing chamber through a conduit the effective passage area of which is controlled by a modulating needle.

One preferred embodiment is shown by way of example in the accompanying drawings and hereinafter described in detail without attempting to show all of the various forms and modifications in which the invention might be embodied; the invention being measured by the appended claims and not the details of the specification.

*Description of a preferred embodiment*

Referring more particularly to the drawings, a system embodying the concept of the present invention is indicated generally by the numeral 10. The system is readily adaptable for metering, mixing and dispensing elastomers formed from two components, as shown in solid line representation in FIG. 1, or, equally well for elastomers formed from more than two components. The chain-line representation depicts a connection for two additional component feed lines to the common mixing head 11 so that a four component elastomer may be mixed and dispensed therefrom, or, selectively, the head 11 may be used to mix and dispense a plurality of two-component elastomers of different formulation.

Figure 1:
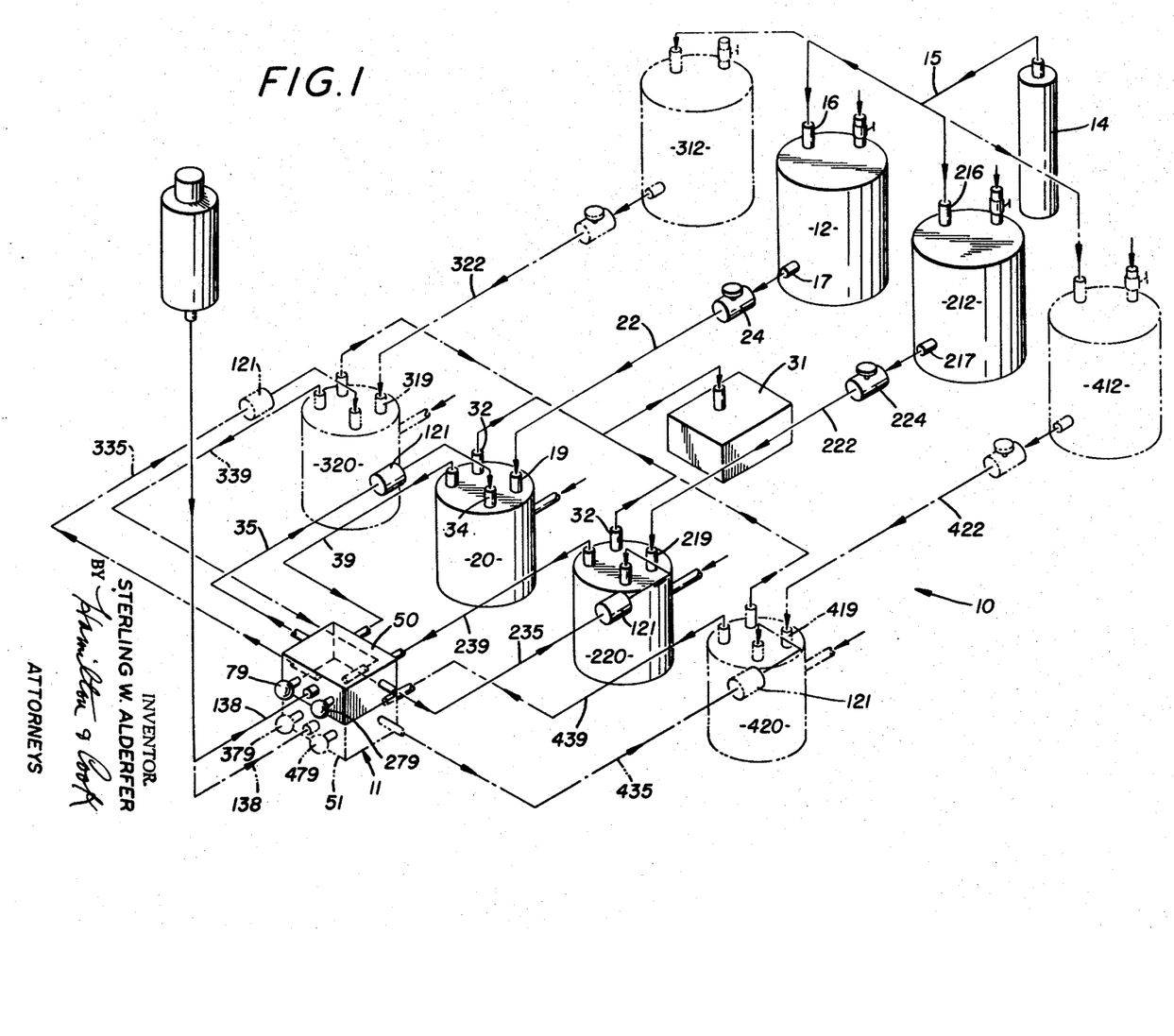
FIG. 1 is a schematic perspective of a typical system embodying the concept of the present invention.

In the solid line representation of the two-component feed, the components are individually stored in two large capacity reservoirs 12 and 212. The reservoirs are sealed from the outside atmosphere and communicate with a dry nitrogen supply 14 by piping 15 so that a layer of nitrogen is provided over the surface of the components within the reservoirs to act as a vapor barrier and thereby prevent the components from absorbing moisture out of the atmosphere. Nitrogen, being wholly inert, is particularly well suited for this purpose.

The reservoir 12 is provided with an inlet 16 and an outlet 17. The inlet 16 is connected to the nitrogen supply line 15, and the outlet 17 of reservoir 12 is connected to the inlet 19 of a degassing tank 20 by pipe line 22. Similarly, the inlet 216 is connected to the nitrogen supply line 15 and the outlet 217 of reservoir 212 is connected to the inlet 219 of an identical degassing tank 220 by pipeline 222. The components in reservoirs 12 and 212 may be pumped into the respective degassing tanks 20 and 220; they may be forced into the degassing tanks by the pressure of the nitrogen in the reservoirs; or, they may equally well be permitted to flow into the degassing tanks by gravity, as depicted. Particularly in the latter case the lines 22 and 222 should be provided with valves 24 and 224, respectively, by which the flow can be controlled.

Figure 2:
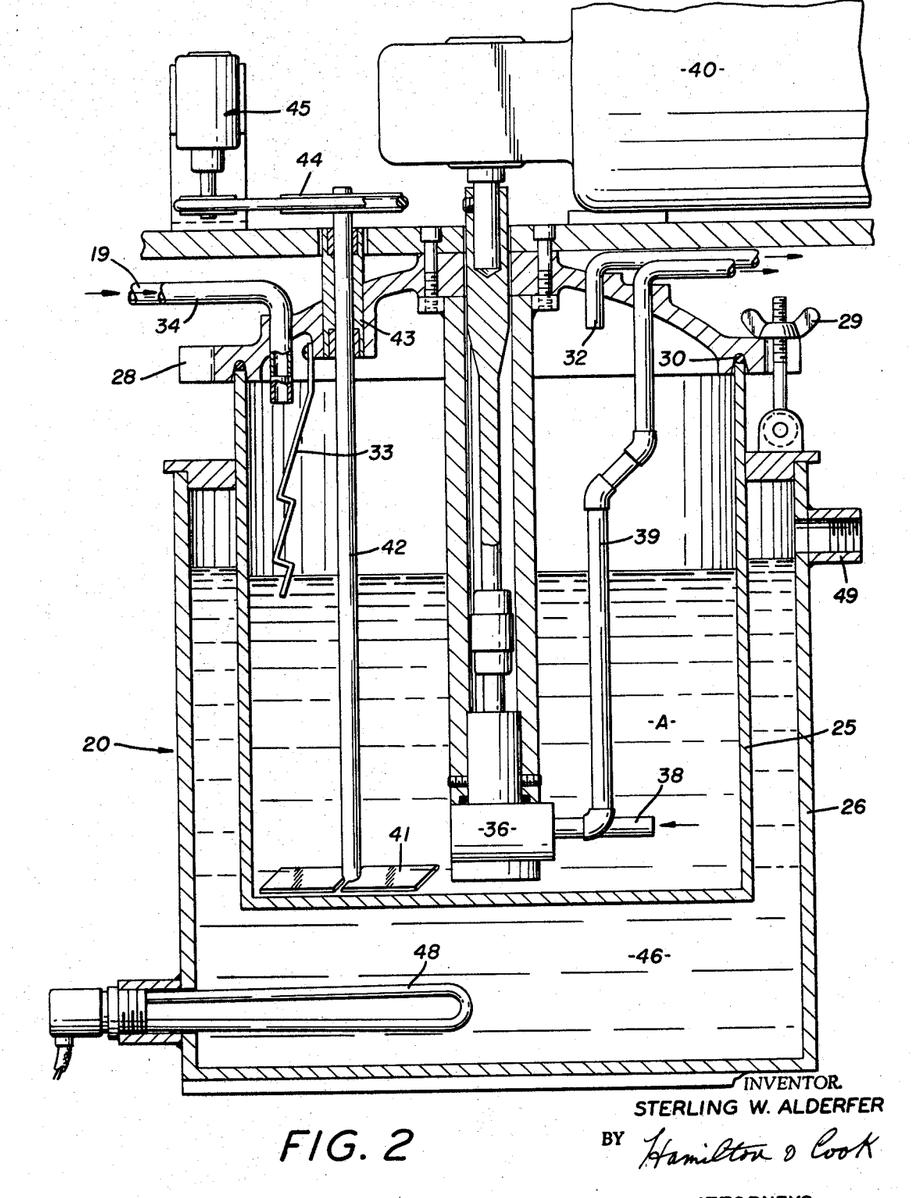
FIG. 2 is a vertical cross section through a typical degassing tank.

A typical degassing tank, such as 20, is best seen in FIG. 2. The component "A" is contained in a stock pot 25 encased within a jacket 26. The cover, or lid, 28 is secured onto the stock pot 25 by a plurality of wing locks 29, the desired air seal being effected by an annular sealing ring 30, or the like, interposed between the pot 25 and its cover 28.

The interior of the pot 25 is subjected to a vacuum by means of a pump 31 (FIG. 1) which communicates through cover 28 by pipe 32. It has been found that although elastomer components can be commercially obtained in an alleged degassed condition, such material laterally boils when subjected to a reduction in air pressure amounting to fifteen inches of mercury. To produce a consistently bubble-free elastomer the components should be subjected to a vacuum on the order of twenty-eight to thirty inches of mercury.

To facilitate degassing, both the inlet and return flows are caused to pass over and across a cascade 33. The cascade 33 prevents the component from plummeting into the volume already within pot 25, which itself would induce entrainment of air, and provides a maximum surface area exposure to the vacuum as the inflowing component pours gently over the cascade 33. The inlet flow is that entering the pot 25 from the reservoir 12 through inlet 19, and the return flow is that which has been returned from head 11 by recirculating pipe 35 (see also FIG. 1), the reason for which is more thoroughly hereinafter explained, and which enters through the second inlet 34.

Submerged within the component A in pot 25 is a pump 36. The suction port 38 of pump 36 is located well beneath the surface of the component A and the discharge from pump 36 communicates, by feed line piping 39, with the head 11.

The pump 36 is driven by a variable speed motor 40 so that the rate of the exhaust flow through the feed line piping 39 can be closely regulated. The control of the speed of motor 40 is thus able to meter the rate at which the component is delivered to the head 11.

In order that component A, which may itself be a mixture, can be maintained homogeneous, an agitator 41 is suspended within the pot 25. The agitator shaft 42 extends upwardly through a sealed bearing 43 in cover 28, and a pulley 44 is secured to the outer end thereof for operative connection with a drive means 45.

Below 120° F. most components for urethane elastomers are in a solid, wax-like state. It is therefore necessary to heat the components to a liquid state. This is accomplished by a heat transfer medium 46 retained in the cavity between the pot 25 and its jacket 26. An immersion heater 48 may be used to heat the medium 46, and it is well to provide an overflow, or pressure release, port 49 through the jacket 26 to accommodate any volumetric and/or pressure change incident to temperature changes.

It should now be apparent that the reservoirs 12 and 212 may also require the use of a suitable heating means as well as an agitating means. The disclosure of a typical heating and agitating arrangement suitable for the degassing tanks will be sufficient to enable one skilled in the art to provide similar, or otherwise suitable, means for the reservoirs.

For a two-component system two degassing tanks 20 and 220 are sufficient to supply the head 11. However, if the head 11 is to dispense two, two-component formulations, a second pair of degassing tanks 320 and 420, together with the associated piping, pumps and reservoirs, would be required. Additional degassing tanks would also be used for degasification of additional components should a formulation of more than two components be desired. Specifically, the inlet 319 of the degassing tank 320 is fed, through pipeline 322, from reservoir 312, and the degassing tank 320 is connected to the head 11 by feed line piping 339 and a recirculating pipe 335. Likewise, the inlet 419 of the degassing tank 420 is fed, through pipeline 422, from reservoir 412, and the degassing tank 420 is connected to the head 11 by feed line piping 439 and a recirculating pipe 435. This additional structure is indicated by the chain line representation in FIG. 1.

The heart of the system lies in the mixing and dispensing head 11, as shown in greater detail in FIGS. 3–12. The head 11 depicted in the aforementioned figures has been compounded to mix four components, or a selective variety of two or three component formulations. To mix and dispense only one two-component formulation the head 11 would incorporate only main housing 50. However, to add the availability of two additional components a dependent, or secondary, housing 51 is secured to the main housing 50, along parting line 52.

Figures 3, 4:
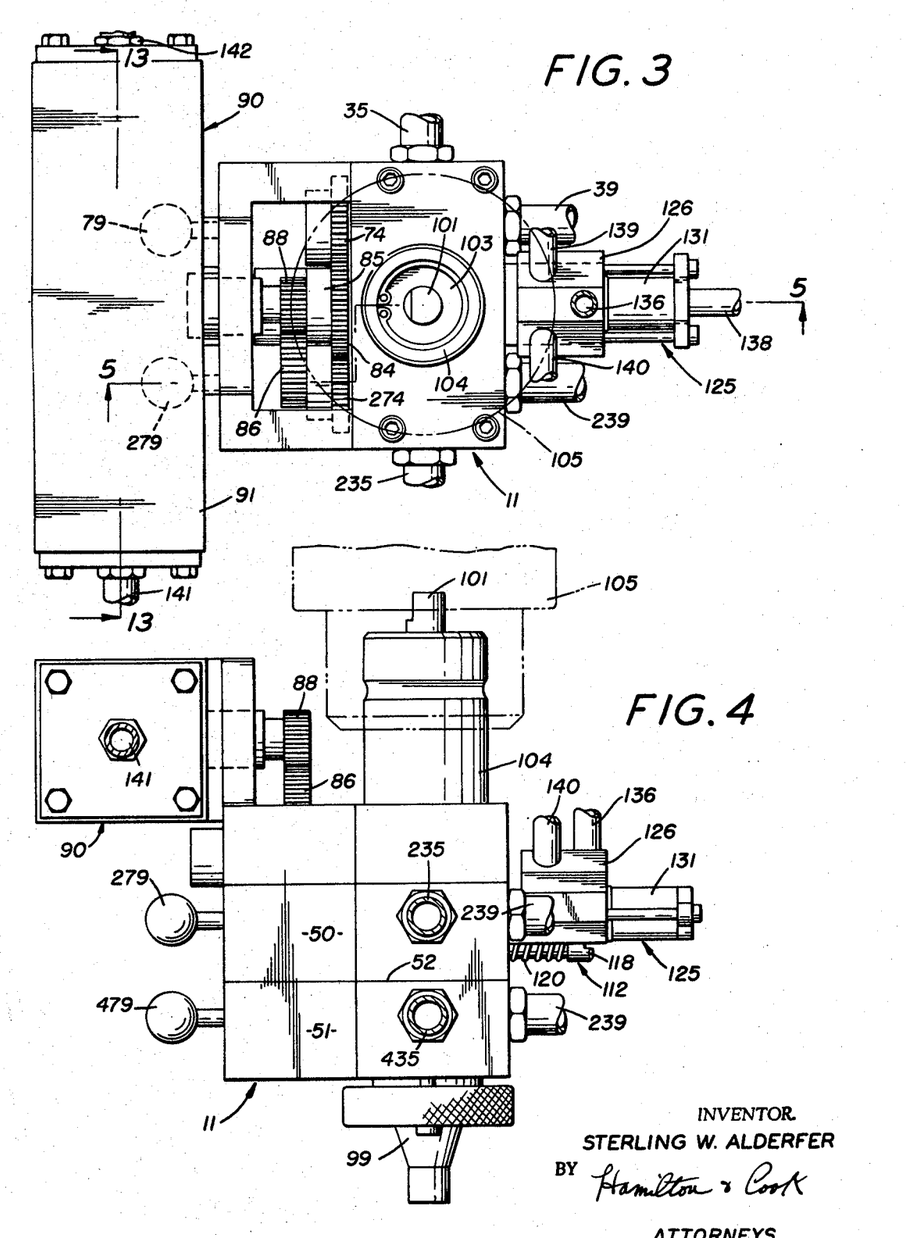
FIG. 3 is a top plan view of a typical mixing and dispensing head especially adapted for the system of the present invention, the particular head depicted being adapted to receive and mix as many as four components.
FIG. 4 is a side elevation of the head represented in FIG. 3.
Figure 7:
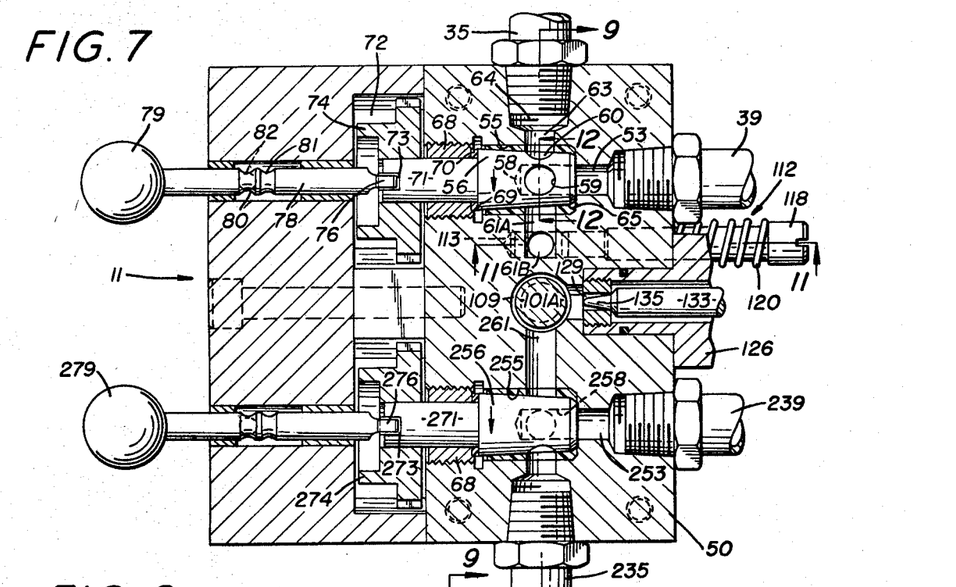
FIG. 7 is a horizontal cross section through the main housing of the head taken substantially on line 7—7 of FIG. 5.
Figure 8:
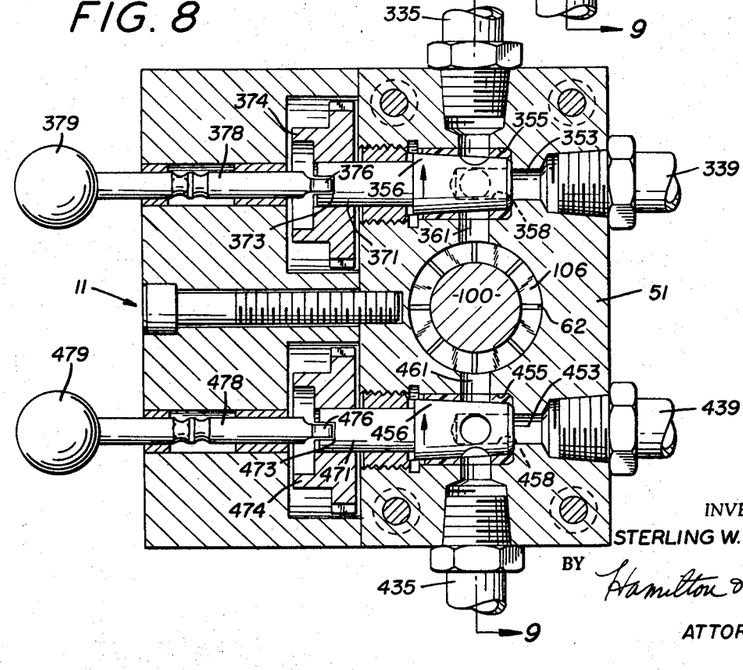
FIG. 8 is a horizontal cross section similar to FIG. 7 taken through the dependent housing substantially on line 8—8 of FIG. 5.

As best shown in FIGS. 3 and 7, the supply line 39 from degassing tank 20 connects to inlet port 53 in housing 50 and the supply line 239 from degassing tank 220 connects to inlet port 253. The supply lines 339 and 439 from degassing tanks 320 and 420, respectively, as best seen in FIG. 8, connect to similar ports 353 and 453 in housing 51.

Figures 10, 11, 12, 13:
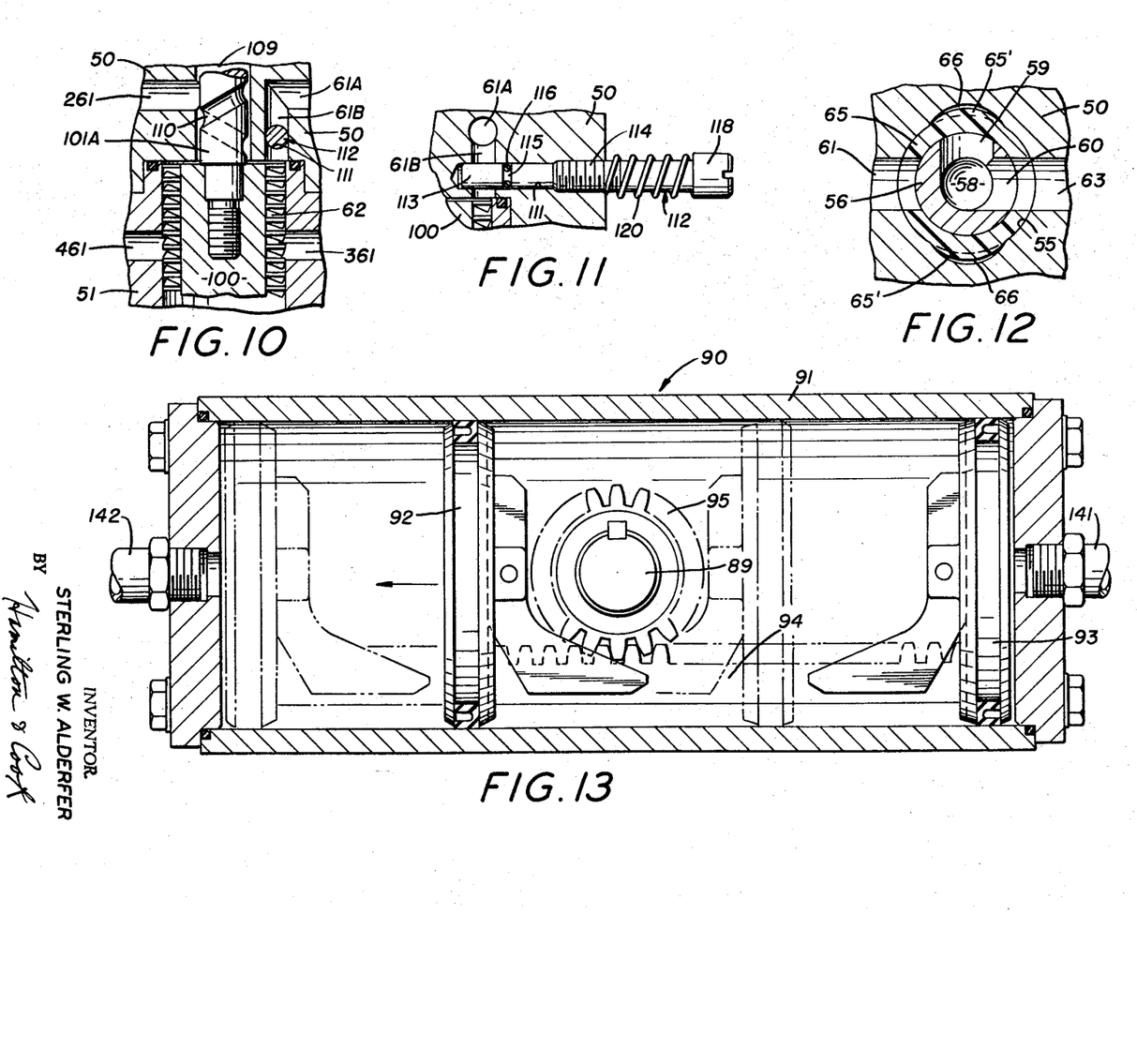
FIG. 10 is a vertical cross section depicting the blender and the auger portion of the shaft on which it is mounted taken substantially on line 10—10 of FIG. 5.
FIG. 11 is a vertical cross section depicting the modulating needle intersecting the passages leading from at least one of the flow control valves to the mixing changer taken substantially on line 11—11 of FIG. 7.
FIG. 12 is a vertical cross section through one of the flow control valves taken substantially on line 12—12 of FIG. 7.
FIG. 13 is an enlarged vertical cross section through the motion converting actuator taken substantially on line 13—13 of FIG. 3.

Each inlet port 53, 253, 353 and 453 communicates with its own valve chamber 55, 255, 355 and 455, respectively, as best shown in FIGS. 7 and 10. Rotatably received within chamber 55 is a tapered flow control valve plug 56. The plug 56 is bored to provide an axial passage 58 which is intersected by two radial passages 59 and 60 at 90° to each other. The axial passage 58 is in continual communication with the inlet port 53. However, the axial passage 58 is in selective communication with the conduit 61 which leads to the mixing chamber 62 or the opposed conduit 63 which leads to the port 64 to which the recirculating pipe 35 is attached. Rotation of the plug 56 through 90° selectively aligns radial passage 59 with conduit 61 or radial passage 60 with conduit 63. A single radial passage could be provided in plug 56 for selective communication with the conduits 61 and 63, but by supplying two passages the angular range through which the plug 56 must be rotated is greatly reduced.

To assure that leakage does not occur around plug 56 a cylindrical Teflon sleeve 65 is compressed between the plug 56 and the valve chamber 55. The maximum sealing effect with the minimal rotational resistance is obtained by providing a peripherally discontinuous recess 66 in chamber 55 (FIG. 12). The recess extends annularly around chamber 55 and is of sufficient axial extent that it would include the openings of conduits 61 and 63, but the recess 66 is discontinuous at those two openings so that the conduits 61 and 63 open into the chamber 55 at points radially inwardly of the recess 66. Accordingly, when the tapered plug 56 is driven into chamber 55 the sleeve 65 forms a very tight seal in the immediate proximity of conduits 61 and 63, but, because of the recess 66 into which the sleeve 65 expands, as represented at 65′ in FIG. 12, does not tend overly to bind the plug 56 against rotation.

The plug 56 is retained in chamber 55 by a spanner nut 68 threaded into the housing 50. A low friction O-ring 69 is positioned between the spanner nut 68 and the plug 56, lying against the shoulder 70 formed by the intersection of the radial rear wall of plug 56 and the cylindrical valve stem 71.

The stem 71 extends axially from the plug 56 into a gear chamber 72, and is provided with a transverse slot 73 on the end thereof remote from the plug 56. A gear 74 is rotatably mounted on stem 71 in gear chamber 72, and the face of the gear 74 is also provided with a transverse slot 75 (FIG. 6) which can be aligned with the slot 73 on valve stem 71.

Figure 6:
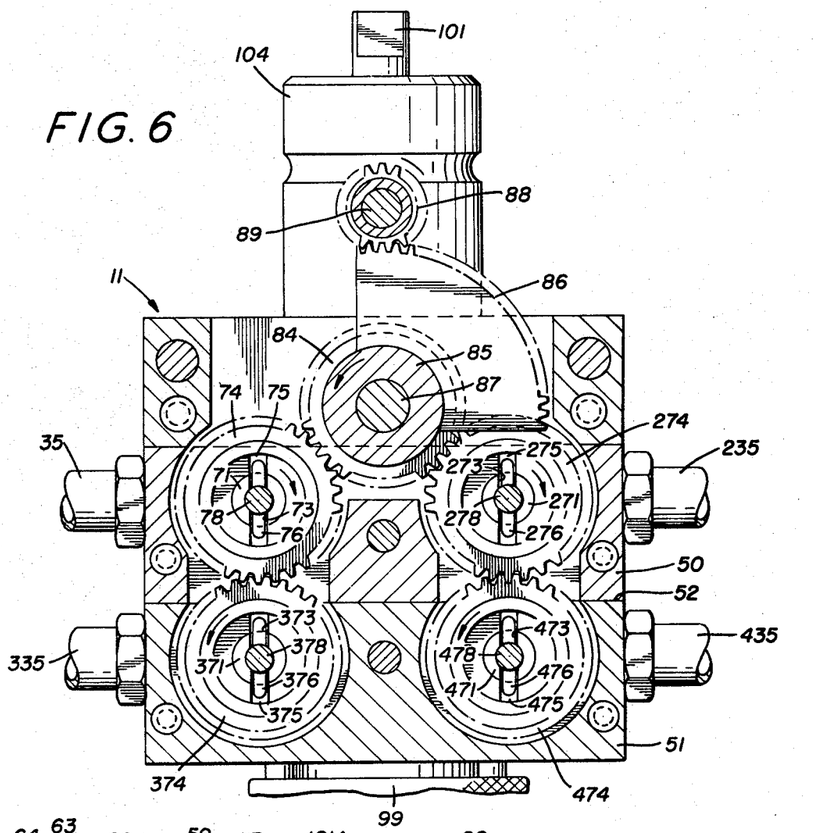
FIG. 6 is a vertical cross section taken substantially on line 6—6 of FIG. 5 depicting the gear train between the valves and their actuating mechanism.

A clutch plate 76 is receivable in slots 73 and 75 when they are aligned so that rotation of gear 74 rotates the valve plug 56. The clutch plate 76 is mounted on an axially shiftable spindle 78 which is rotatably mounted in, and extends outwardly of, the housing 50. A knob 79 is attached to the outer end of the spindle 78 so that the spindle can be manually translated to move the clutch plate 76 into and out of slots 73 and 75. Two annular grooves 80 and 81 are provided on spindle 78 for engagement with a ball 82 biased by spring 83. The engagement of ball 82 with groove 80 serves as a detent to retain, and also indicate, the "in-gear" position when the clutch plate 76 is received in slots 73 and 75. The engagement of ball 82 with groove 81 serves as a detent to retain, and also indicate, the "out-of-gear" position when the clutch plate 76 is withdrawn from the slots 73 and 75 so that the gear 74 can rotate with respect to the valve spindle 78.

The piping 239 from degassing tank 220 communicates with the mixing chamber 62 through a similar valve chamber 255 in which a valve plug 256 is rotatably actuated by a gear 274 that can be selectively connected to or disconnected therefrom by manual translation of knob 279 to move clutch plate 276 selectively into and out of engagement with the slots 273 and 275 in spindle 271 and gear 274, respectively, as heretofore explained with regard to the translation knob 79.

When a dependent housing 51 is affixed to main housing 50, as for the selective admission of two additional components to the mixing chamber 62, the gears 374 and 474 are similarly connected to valve plugs 356 and 456. Knobs 379 and 479 are provided so that axial translation of the spindles 378 and 478 by knobs 379 and 479 will selectively engage and disengage clutch plates 376 and 476 from the slots 373 and 473 in spindles 371 and 471 and the slots 375 and 475 in gears 374 and 474.

As can best be seen in FIG. 6 the gear 74 intermeshes with gear 374 and gear 274 intermeshes with gear 474. At the same time gears 74 and 274 intermesh with a common drive gear 84. This pinion drive gear 84 is secured to a sleeve 85 rotatably journaled on shaft 87 in housing 50. Also carried on sleeve 85 is a quadrant plate 86, in turn intermeshingly engaged with another pinion 88 non-rotatably secured to the shaft 89 of a motion converting actuator indicated generally by the number 90.

The actuator 90, best seen in FIG. 13, comprises a cylinder 91 in which two, opposed, and spaced apart pistons 92 and 93 are connected by a rack 94. The rack 94 intermeshingly engages a second pinion 95 also non-rotatably secured to shaft 89. By this arrangement movement of the rack 94 in one direction (that of the arrow in FIG. 13) results in counterclockwise rotation of drive gear 84, via the gear train comprised of the pinions 95 and 88 on shaft 89 and the quadrant 86 on shaft 85.

As will be seen from FIGS. 6–9 counterclockwise rotation of drive gear 84 rotates gears 74 and 274 in a clockwise direction and gears 374 and 474 in a counterclockwise direction. Reciprocation of rack 94 in a direction opposite the direction of the arrow in FIG. 13 reversely rotates the gears 74, 274, 374 and 474.

Figure 9:
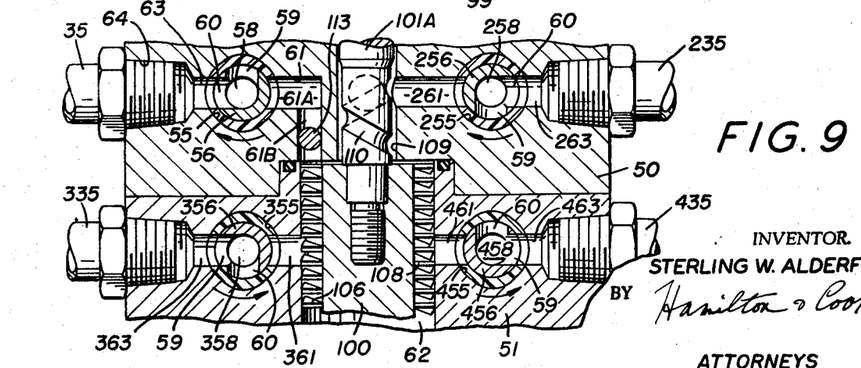
FIG. 9 is a partial vertical cross section depicting the valve plugs in recirculating position, taken substantially on line 9—9 of FIGS. 7 and 8.

Inasmuch as the passages 59 and 60 in valve plug 56 are at right angles it is necessary to rotate the valves only 90° so that the axial passage 58 is always in communication with conduit 61 or 63. As shown in FIG. 9, the four plugs 56, 256, 356 and 456 can be identical and yet so oriented within housings 50 and 51 that a quarter revolution of drive gear 84 will permit selective connection of the axial passages 58, 258, 358 and/or 458 with the associated conduits 61, 261, 361 and 461 which communicate with the mixing chamber 62.

The typical orientation for recirculation shown in FIG. 9 has plug 56 received in housing 50 with passage 59 oriented vertically upwardly and passage 60 oriented horizontally and to the left, as viewed in FIG. 9. Plug 256 would be correspondingly positioned in housing 50 with passage 59 oriented vertically downwardly and passage 60 oriented horizontally and to the right.

Identical plugs can also be used in the secondary housing 51, but in order to accommodate their control by the train of intermeshed gears 74, 374 and gears 274, 474 the passage 59 will communicate with conduit 63 and passage 60 communicates with conduit 61, which is reversely of the order in housing 50. As such, for recirculation plug 356 is received in housing 51 with passage 59 oriented horizontally and to the left and passage 60 oriented vertically downwardly. Plug 456 would be correspondingly positioned in housing 51 with passage 59 oriented horizontally and to the right and passage 60 oriented vertically upwardly.

So oriented, a quarter rotation of drive gear 84 in the direction of the arrow on FIG. 6 will rotate the plugs 56, 256, 356 and 456 in the direction of the arrows on FIGS. 6 through 9 to connect the inlet ports 53, 253, 353 and 453, through axial passages 58, 258, 358 and 458, respectively, with the mixing chamber 62. Selectivity as to which plugs will be rotated upon rotation of the drive gear 84 is achieved by manual positioning of the appropriate clutch plate 76, 276, 376 and 476, respectively, as heretofore explained with regard to the translation of knobs 79, 279, 379 or 479. It should be noted that irrespective of whether or not a particular gear 74, 274, 374 and 474 is connected, by a clutch plate 76, 276, 376 and 476 to its corresponding plug 56, 256, 356 and 456, that gear will still function in the overall gear train so that any single, or any combination of, components can be delivered into the mixing chamber 62.

The mixing chamber 62 extends from housing 50, through secondary housing 51, and into the cavity 98 of the funnel-like discharge nozzle 99. A blender 100 is closely received in the mixing chamber 62 and is carried on a drive shaft 101 for rotation in the mixing chamber 62.

A pair of journals 102 and 103 are spaced apart on shaft 101 to provide lateral stability for the blender 100 and are themselves received in a journal box 104 formed in the housing 50. Exteriorly of the housing 50 the shaft 101 is connected to a drive means, such as motor 105, for rotating the blender 100. Stability of the blender is particularly desirable since it rotates on the order of 6000 to 9000 r.p.m.

The blender itself has a multiplicity of radially extending fins 106 which are aligned in axial rows. While the base portion 108 of each fin 106 is oriented transversely the longitudinal axis of the blender 100, the fin is contorted outwardly of the base in a gentle twist such that rotation of the blender tends to impel the fluid contacted thereby downwardly toward the discharge spout 99.

The auger portion 101A of the shaft 101, which extends between the blender 100 and the lowermost of the two journals 102, is of lesser diameter than the blender 100 and closely turns in a cylindrical feed chamber 109 which leads to, but is of considerably lesser diameter than, the mixing chamber 62. The auger portion 101A is provided with a helical groove 110 on the radially outer surface which is of a hand opposite the direction that the shaft is intended to rotate so that any material in the feed chamber 109 is induced to flow downwardly into the mixing chamber 62.

As can best be seen in FIGS. 7, 10 and 11, the conduit 61 which communicates between valve chamber 55 and the mixing chamber 62 is formed in two legs 61A and 61B. Leg 61B, which terminates in mixing chamber 62, is preferably of circular cross section and is intersected by a cylindrical passage 111 in which a modulating needle 112 is matingly fitted to extremely close tolerance. The needle 112 has a plug portion 113 on the end thereof which is positionable through and across leg 61B to a selective degree. Between the plug portion 113 and the threaded shank portion 114 the needle is provided with a peripheral notch 115 in which a sealing gasket 116 is retained. The head 118 is slotted so that the plug portion 113 can be simply adjusted axially in the leg portion 61B of conduit 61 by a screw driver. Although the mating of the threaded shank 114 of the needle 112 with the threads 119 in a corresponding portion of the cylindrical passage 111 permits selective axial translation of the plug portion 113, it has been found that the use of a compression spring 120 interpositioned between the head 118 and the housing 50 eliminates the backlash inherent between mating threads and permits very fine adjustment of the degree to which the plug portion 113 is interposed within the leg portion 61B.

To the contrary the conduit 261 which communicates between plug 256 and the mixing chamber 62, via feed chamber 109, need not be supplied with modulating means, such as needle 112.

Experience indicates that so long as the viscosities of the components are within approximately a 4:1 range and the required quantities of each are also approximately the same for the formulation to be dispensed, then the conduit from neither plug 56 nor 256 need be restricted. However, when the disparity between the viscosities of the components begins to exceed approximately 4:1, and particularly when the volume of each shot being dispensed is small, erratic metering results unless a modulating means is provided at least in that conduit supplying the less viscose component. This erratic metering has been found to be further compounded when the volumetric ratio of the components is disparate.

Erratic metering for both reasons can be overcome by the use of a modulating needle 112, as described above, in combination with the restrictive flow valve 121 in each of the recirculating pipes 35, 235, 335 and 435 which return the individual components to their respective degassing tanks 20, 220, 320 and 420.

Without the use of a needle 112 either of two unacceptable alternatives have been found to occur. If the mixing chamber 62 is empty, the less viscose material tends to gush into chamber 62 well ahead of the more viscose material and thus tends to preclude proper mixing. On the other hand, if some residual material remains in the head from the immediately preceding dispensation the less viscose material cannot build up sufficient pressure to force its way into the mixing chamber 62, particularly when the required charge can be dispensed within a very short duration of time. The modulating needle 112 prevents gushing and at the same time induces retention of a residual volume of the component in legs 61A and 61B so that a rapid pressure buildup occurs to facilitate entry of the less viscose material into the mixing chamber 62.

The restrictive flow means 121 in the recirculating pipes 35, 235, 335 and 435 similarly prevents the material in those pipes from draining into the degassing tanks 20, 220, 320 and 420 during the time that material is being dispensed. Otherwise, when the plugs 56, 256, 356 and 456 reconnect the feed line piping 39, 239, 339 and 439 to the recirculating pipes 35, 235, 335 and 435 there would be an immediate pressure drop in the feed line piping so that if the plugs 56, 256, 356 and 456 were then actuated to cause dispensing through head 11, improper metering would obtain as a result of the pressure drop.

While a shot charging situation where the interval between discharges is only a matter of a few seconds does not require it, a longer interval between discharges requires that the mixing chamber 62 and the feed chamber 109 be voided so that the residual components do not congeal and foul the head 11. A flush assembly, indicated generally by the numeral 125 in FIG. 5 accomplishes this purpose.

Figure 5:
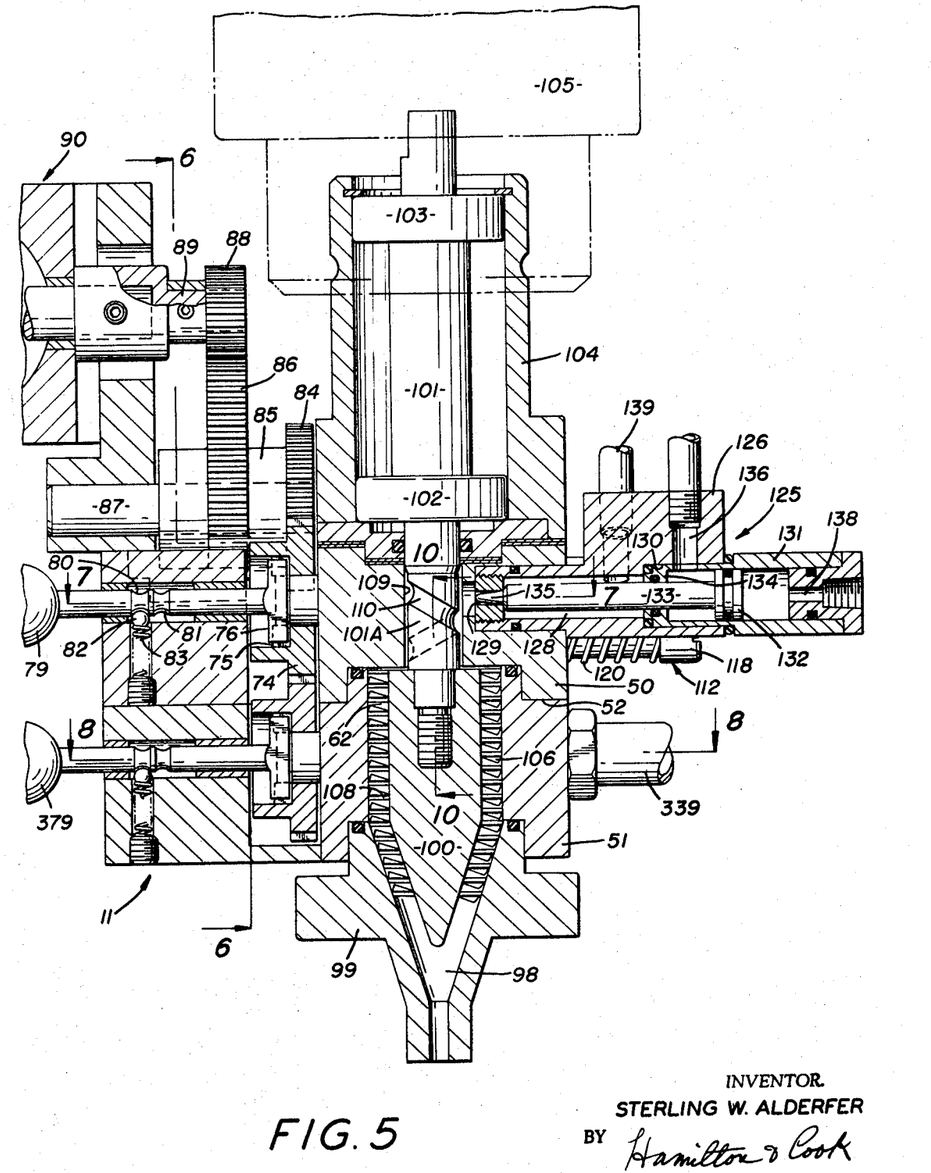
FIG. 5 is an enlarged cross section taken substantially on line 5—5 of FIG. 3.

The valve housing 126 of valve assembly 125 is sealingly fitted into the housing 50 of head 11 with the internal flush bore 128 of the assembly 125 communicating, through flush port 129, with the upper region of feed chamber 109. The outermost portion of the flush bore 128 is counterbored, at 130, to receive the valve cylinder 131. Reciprocally slidable within the cylinder 131 is a double-headed piston 132 secured to a valve stem 133 which extends axially outwardly from one side of piston 132, through the end wall 134 of the cylinder 131 and along the extent of the flush bore 128, terminating in a tapered tip 135 which penetrates to the feed chamber 109 through port 129.

An air, or other fluid, pressure line is connected, through duct 136, to the stem-side of piston 132 for withdrawal of the tip 135 from port 129, and a second duct 138 provides admission of a fluid pressure medium to the opposite side of piston 132 for seating the tip 135 within port 129.

Two more ducts 139 and 140 (FIG. 3) are connected to the flush bore 128 for the selective admission of air and a solvent such as methylene chloride. With this arrangement the tip 135 can be withdrawn from port 129 and a solvent admitted as through duct 139 to void the feed and mixing chambers 109 and 62, respectively, of all residual components. Thereafter, the solvent can be removed by the admission of air under pressure, as through duct 140.

To operate the system heretofore disclosed the operator would proceed substantially as follows.

With the pumps 36 in each degassing tank 20, 220, 320 and/or 420 in operation each component is being constantly supplied to the head 11 through feed lines 39, 239, 339 and/or 439. When the component reaches head 11 it will, if the plugs 56, 256, 356 and 456 are in the position depicted in FIG. 9, be returned, through recirculating lines 35, 235, 335 and 435, to their respective degassing tanks where they will flow across cascade 33 (FIG. 2) and any air entrained during its journey will be removed.

To establish the discharge of a particular formulation the operator will translate all but one of the knobs 79, 279, 379 and 479 outwardly to leave only one clutch plate, for example, 76 engaged with its respective gear 74 and spindle 71. The actuator 90 is then activated, as by admission of fluid pressure through duct 141 against piston 93 to move the rack 94 from the solid line to the dotted line representation in FIG. 13. This, by the gear train heretofore described causes that plug valve 56, for which the clutch plate 76 remained engaged, to rotate one quarter turn. The component passing through plug 56 is now directed through the head 11 to the mixing chamber and out the discharge nozzle 98 where it can be weighed against time. The rate at which that component is discharged can be closely regulated by varying the speed of the motor 40 which operates pump 36. When the desired rate of discharge has been established, the actuator 90 is reversely activated, as by the admission of fluid pressure through duct 142 against piston 92 and the plug 56 counterrotates one quarter revolution to recirculate that component.

The mixing chamber can then be voided by flush assembly 125 and the discharge rate for each of the other components in the desired formulation can be similarly established. As should now be apparent one or more formulations can be discharged from head 11 by pre-establishing the rate at which each component is delivered to the head and then selecting the particular formulation desired by manipulating the particular knobs 79, 279, 379 and 479 for the components desired.

Furthermore, by continuously recirculating the components at all times when they are not being fed into the mixing chamber the components remain exceptionally degassed and produce end products which are extraordinarily bubble free. The subject system and the unique control head disclosed herein accordingly accomplish the objects of the invention.

What is claimed is:

1. A system for metering, mixing and dispensing a formulation of two or more liquid components comprising, a stock pot for each component, a vacuum means applied to at least selected of said stock pots, a dispensing head having a mixing chamber, a feed line connecting each stock pot to said dispensing head, a modulating means between the mixing chamber and at least one of said feed lines selectively to control the flow therebetween, a corresponding recirculating line connecting the dispensing head to each said pot, means within each said stock pot whereby the material entering therein is provided with a maximum surface area exposure to said vacuum means, a restrictive flow means incorporated in each recirculating line, individual valve means for connecting each said feed line to the corresponding recirculating line and, selectively, to said mixing chamber, and pump means for continuously moving each said component from its respective stock pot through the corresponding feed line.

2. A system, as set forth in claim 1, in which a supply reservoir is connected to each stock pot, the material entering the stock pot from said reservoir also flowing over said cascade, and in which an inert, moisture barrier is provided to overlie the component in said reservoir.

3. A system, as set forth in claim 2, in which the inert, moisture barrier is nitrogen.

4. A system, as set forth in claim 1, in which the dispensing head comprises, a housing, a plurality of valve chambers in said housing, each said feed line communicating with one said valve chamber, a valve plug in each chamber for connecting said feed line to said recirculating line and, selectively, to said mixing chamber in said housing, each said valve plug being rotatable between a first position to connect said feed line to said recirculating line and a second position to connect said feed line to said mixing chamber, a spindle extending outwardly of said valve plug, gear means mounted on said spindle for rotation with respect thereto, clutch means selectively to connect said spindle to said gear means for rotation therewith, and actuating means for selectively rotating said gear means.

5. A system, as set forth in claim 4, in which the gear means associated with each valve plug are driven by a common pinion.

6. A system, as set forth in claim 5, in which the clutch means connecting each gear means to the respective spindle is a plate reciprocally translatable into and out of a radial slot on said gear and a registrable radial slot on said spindle.

7. A system, as set forth in claim 4, in which at least one valve chamber communicates with said mixing chamber through a conduit in which a modulating needle is selectively positionable through and across said conduit to control the effective cross sectional flow area of said conduit at the location of said needle.

8. A system, as set forth in claim 7, in which said modulating needle has a threaded shank portion matingly received in a threaded bore in said housing, and a spring means continuously biases said thread means in one direction against said threaded bore to preclude the backlash.

9. A system, as set forth in claim 8, in which a restrictive flow means is incorporated in each said recirculating line.

10. A system, as set forth in claim 4, in which a blender is rotatably received in said mixing chamber, said blender being rotatable by a shaft which extends from its drive means to said blender through a feed chamber, that portion of said shaft extending through said feed chamber being provided with a groove of a hand opposite the direction that said shaft rotates.

11. A system, as set forth in claim 4, in which a flush assembly communicates with the mixing chamber through a flush port, said flush assembly comprising, a valve stem reciprocably received in a flush bore, a tip on one end of said valve stem, said tip insertably received in said flush port to close said mixing chamber to said flush bore by movement of said valve stem in one direction and said tip removable from said flush port to open said mixing chamber to said flush bore by reciprocable movement of said valve stem, at least one duct communicating with said flush bore to admit a flushing means through said flush port into said mixing chamber.

12. A system, as set forth in claim 11, in which two ducts communicate with said flush bore, a solvent being admissible by the first of said ducts through said flush port into said mixing chamber, and pressurized air being admissible by the second of said ducts through said flush port and into said mixing chamber.

13. A system, as set forth in claim 12, in which a double faced piston is secured to the end of said valve stem opposite said tip, said piston slidably received in a cylinder, fluid means being admissible to the cylinder on one side of said piston to withdraw the tip from said flush port and fluid means being admissible to the cylinder on the opposite side of said piston to insert said tip in said flush port.

References Cited
UNITED STATES PATENTS

| | | | |
|---|---|---|---|
| 2,788,953 | 4/1957 | Schneider | 222—134 X |
| 3,067,987 | 12/1962 | Ballou et al. | 222—318 X |
| 3,123,342 | 3/1964 | Little | 222—134 X |
| 3,306,495 | 2/1967 | Wabers | 222—318 X |

ROBERT B. REEVES, *Primary Examiner.*

HADD S. LANE, *Examiner.*

UNITED STATES PATENT OFFICE
CERTIFICATE OF CORRECTION

Patent No. 3,390,813                                                                             July 2, 1968

Sterling W. Alderfer

It is certified that error appears in the above identified patent and that said Letters Patent are hereby corrected as shown below:

Column 1, line 25, "selectivel, simultaneous actuation of any one" should read -- accurately metering the components ad- --. Column 4, line 39, "lateral should read -- literally --; line 56, "Submerged" should read -- Submersed --. Column 5, line 32, "aforementioned" should read -- aforesaid --. Column 8, line 48, "the restrictive" should read -- a restrictive --.

Signed and sealed this 21st day of April 1970.

(SEAL)
Attest:

Edward M. Fletcher, Jr.                               WILLIAM E. SCHUYLER, JR.
Attesting Officer                                            Commissioner of Patents